(12) United States Patent
Kuo

(10) Patent No.: US 9,103,993 B2
(45) Date of Patent: Aug. 11, 2015

(54) OPTICAL FIBER COUPLING CONNECTOR WITH LAYERED ARRAYS OF OPTICAL FIBERS

(71) Applicant: HON HAI PRECISION INDUSTRY CO., LTD., New Taipei (TW)

(72) Inventor: Chang-Wei Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 29 days.

(21) Appl. No.: 14/065,643

(22) Filed: Oct. 29, 2013

(65) Prior Publication Data

US 2014/0205238 A1    Jul. 24, 2014

(30) Foreign Application Priority Data

Jan. 22, 2013  (TW) .............................. 102102367 A

(51) Int. Cl.
G02B 6/36    (2006.01)
G02B 6/38    (2006.01)
G02B 6/42    (2006.01)

(52) U.S. Cl.
CPC ............ *G02B 6/3672* (2013.01); *G02B 6/3861* (2013.01); *G02B 6/3885* (2013.01); *G02B 6/4246* (2013.01); *G02B 6/4249* (2013.01); *G02B 6/4292* (2013.01)

(58) Field of Classification Search
CPC .. G02B 6/3672; G02B 6/3861; G02B 6/4292; G02B 6/4246; G02B 6/4249; G02B 6/3885
See application file for complete search history.

(56) References Cited

U.S. PATENT DOCUMENTS

| | | | | |
|---|---|---|---|---|
| 4,979,972 A | * | 12/1990 | Berkey et al. .................... | 65/408 |
| 2005/0018967 A1 | * | 1/2005 | Huang et al. ..................... | 385/39 |
| 2008/0044137 A1 | * | 2/2008 | Luther et al. .................... | 385/60 |
| 2009/0257717 A1 | * | 10/2009 | Liu et al. ......................... | 385/66 |
| 2012/0092629 A1 | * | 4/2012 | Chang et al. .................... | 353/97 |

* cited by examiner

*Primary Examiner* — Akm Enayet Ullah
(74) *Attorney, Agent, or Firm* — Novak Druce Connolly Bove + Quigg LLP

(57) ABSTRACT

An optical fiber coupling connector of compactness includes a main body, and first and second layers of optical fibers which are all parallel. The main body includes an upper surface, a lower surface, a front surface, and a back surface. The upper surface carries a row of light-emitting optical fibers and the lower surface carries a row of light-receiving optical fibers. The upper surface partially or entirely overlaps the lower surface perpendicularly. The light-emitting fibers are fixed in the upper surface with first glue body and any excess glue flows to and collects by a recess in the upper surface. The light-receiving fibers are fixed in the lower surface with second glue body and any excess glue flows to and collects in a recess in the lower surface.

10 Claims, 4 Drawing Sheets

OPTICAL FIBER COUPLING CONNECTOR WITH LAYERED ARRAYS OF OPTICAL FIBERS

BACKGROUND

1. Technical Field

The present disclosure relates to communication technologies, and particularly to optical fiber coupling connectors.

2. Description of Related Art

An optical fiber coupling connector is used in fiber-optic data transmission. The optical fiber coupling connector includes a number of light-emitting modules, a number of light-receiving modules, and a number of optical fibers. Typically, the light-emitting modules and the light-receiving modules are alternately arranged side by side one after the other in a single imaginary line of the optical fiber coupling connector. The optical fibers correspond to the light-emitting modules and the light-receiving modules one-to-one. That is, the optical fibers are arranged side by side one after the other in a single imaginary plane of the optical fiber coupling connector. Some of the optical fibers are optically coupled with the light-emitting modules one-to-one to form a number of first light paths, and the other optical fibers are optically coupled with the light-receiving modules one-to-one to form a number of second light paths. Thus the first and second light paths are alternately arranged side by side one after the other in the single imaginary plane. In order that the optical fiber coupling connector have a large number of first and second light paths to provide high transmission capacity, a large number of the light-emitting modules and a large number of the light-receiving modules need to be arranged along the single line, and a correspondingly large number of optical fibers needs to be arranged side by side one after the other in the single imaginary plane. This requirement increases the overall width of the optical fiber coupling connector, and militates against the need for compactness.

Therefore, it is desirable to provide an optical fiber coupling connector, which can overcome or at least alleviate the limitations described.

DETAILED DESCRIPTION

Figure 1:
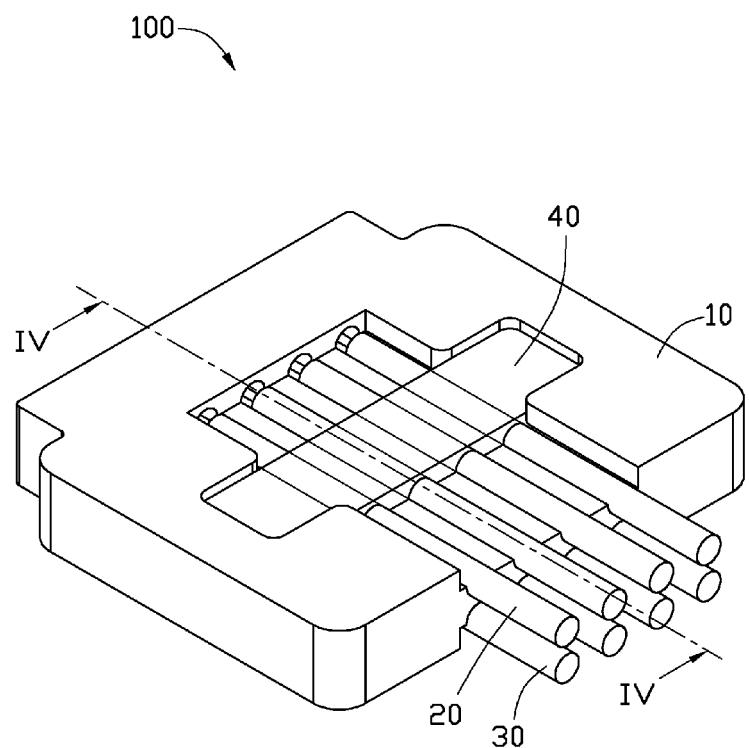
FIG. 1 is a schematic, isometric view of an optical fiber coupling connector including a main body, according to an exemplary embodiment.
Figure 4:
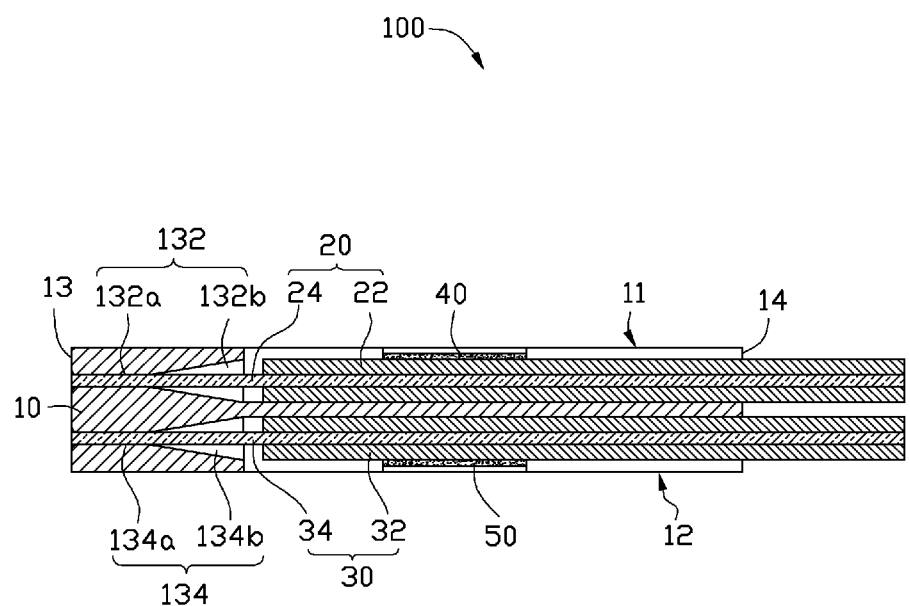
FIG. 4 is a cross-sectional view of the optical fiber coupling connector of FIG. 1, taken along a line IV-IV thereof.

FIGS. 1 and 4 show an optical fiber coupling connector 100 according to an exemplary embodiment. The optical fiber coupling connector 100 includes a main body 10, four first optical fibers 20, four second optical fibers 30, a first glue body 40, and a second glue body 50. The optical fiber coupling connector 100 saves space by positioning the group of first optical fibers 20 on top of the group of second optical fibers 30 in a two-layer arrangement. In one embodiment, the first optical fibers 20 provide light-feeding lines (or paths), and the second optical fibers 30 provide light-receiving lines. In another embodiment, the first optical fibers 20 provide light-receiving lines, and the second optical fibers 30 provide light-feeding lines.

Figure 2:
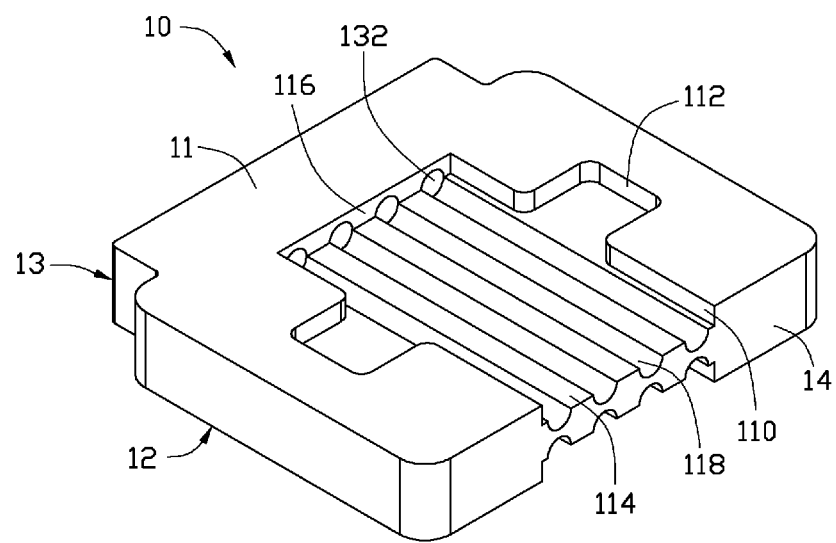
FIG. 2 is a view of the main body only of FIG. 1.
Figure 3:
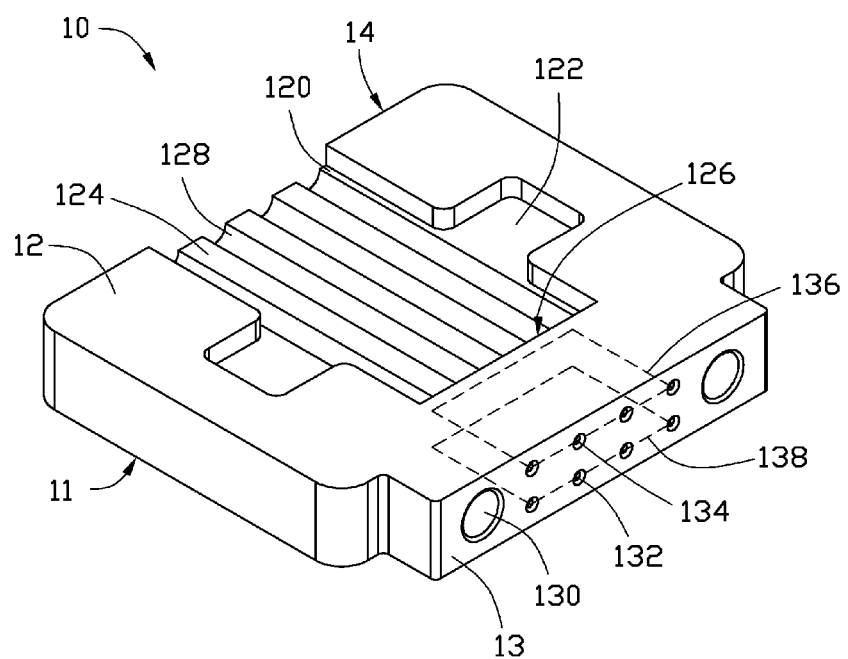
FIG. 3 is similar to FIG. 2, but viewed from another aspect with the main body inverted.

Referring also to FIGS. 2 and 3, the main body 10 is substantially a cuboid. The main body 10 includes an upper surface 11, a lower surface 12, a front surface 13, and a back surface 14. The upper surface 11 and the lower surface 12 are positioned at opposite sides of the main body 10, and the upper surface 11 is substantially parallel to the lower surface 12. The front surface 13 and the back surface 14 are positioned at opposite sides of the main body 10, and the front surface 13 is substantially parallel to the back surface 14. The front surface 13 is perpendicularly interconnected between the upper surface 11 and the lower surface 12, and the back surface 14 is perpendicularly interconnected between the upper surface 11 and the lower surface 12.

The upper surface 11 defines an upper recess 110 and two first receiving recesses 112. The upper recess 110 passes through the back surface 14, but does not reach the front surface 13. The main body 10 further includes a first recessed surface 114 and a first side surface 116 both bordering the upper recess 110. The first recessed surface 114 is located at the bottom of the upper recess 110. The first recessed surface 114 defines four first receiving grooves 118 for receiving the four first optical fibers 20. In this embodiment, each of the four first receiving grooves 118 is substantially semicircular. The first side surface 116 perpendicularly extends from the first recessed surface 114, and is substantially parallel to the front surface 13. The first receiving recesses 112 are located at opposite sides of the upper recess 110, and are symmetrical with each other across the upper recess 110. Each of the first receiving recesses 112 is in communication with the upper recess 110.

The structure of the lower surface 12 is substantially the same as the structure of the upper surface 11. In detail, the lower surface 12 defines a lower recess 120 and two second receiving recesses 122. The lower recess 120 passes through the back surface 14, but does not reach the front surface 13. The main body 10 further includes a second recessed surface 124 and a second side surface 126 both bordering the lower recess 120. The second recessed surface 124 is located at the top of the lower recess 120. The second recessed surface 124 defines four second receiving grooves 128 for receiving the four second optical fibers 30. In this embodiment, each of the four second receiving grooves 128 is substantially semicircular. The second side surface 126 perpendicularly extends from the second recessed surface 124, and is substantially parallel to the front surface 13. The second receiving recesses 122 are located at opposite sides of the lower recess 120, and are symmetrical with each other across the lower recess 120. Each of the second receiving recesses 122 is in communication with the lower recess 120.

FIGS. 2-4 show that the front surface 13 defines two locating holes 130, four first through holes 132, and four second through holes 134. Each of the upper recess 110 and the lower recess 120 is arranged between two alignments defined by the lengths of the two locating holes 130. The four first through holes 132 are located between the two locating holes 130. In detail, the first through holes 132 are arranged side by side at equal intervals along a same imaginary first plane 138, with centers of the first through holes 132 coinciding with the first plane 138. The four second through holes 134 are also located between the two locating holes 130. In detail, the second through holes 134 are arranged side by side at equal intervals along a same imaginary second plane 136, with centers of the second through holes 134 coinciding with the second plane 136. The first plane 138 is below and substantially parallel to the second plane 136. The first plane 138 has a width defined by the distance from an outmost long side of an endmost first through hole 132 to an outmost long side of an opposite endmost first through hole 132. The second plane 136 has a width defined by the distance from an outmost long side of an endmost second through hole 134 to an outmost long side of an opposite endmost second through hole 134. The second plane 136 partially or entirely overlaps the first plane 138. In this embodiment, the second plane 136 entirely overlaps the first plane 138. Thus, the first through holes 132 are aligned with the second through holes 134, respectively. That is, each second through hole 134 is directly below a corresponding first through hole 132.

The first through holes 132 pass through the first side surface 116 and the front surface 13, and are in communication with the upper recess 110. Each of the first through holes 132 includes a first holding portion 132a, and a first receiving portion 132b communicating with the first holding portion 132a. The first holding portion 132a and the first receiving portion 132b are arranged in that order from the front surface 13 to the first side surface 116. In this embodiment, the first holding portion 132a is substantially cylindrical, and the first receiving portion 132b is substantially in the shape of a truncated cone. The diameter of the first receiving portion 132b gradually decreases along a direction from the first side surface 116 to the front surface 13.

The second through holes 134 pass through the second side surface 126 and the front surface 13, and are in communication with the lower recess 120. Each of the second through holes 134 includes a second holding portion 134a, and a second receiving portion 134b communicating with the second holding portion 134a. The second holding portion 134a and the second receiving portion 134b are arranged in that order from the front surface 13 to the second side surface 126. In this embodiment, the second holding portion 134a is substantially cylindrical, and the second receiving portion 134b is substantially in the shape of a truncated cone. The diameter of the second receiving portion 134b gradually decreases along a direction from the second side surface 126 to the front surface 13.

Each of the first optical fibers 20 includes a first main portion 22 which is substantially circular in section, and a coaxial first front portion 24. The first main portion 22 comprises a core portion, and a cladding portion surrounding the core portion. The first front portion 24 comprises the core portion exposed from the cladding portion, and the first front portion 24 has a certain critical length. Each first main portion 22 is received in a corresponding first receiving groove 118, and each first front portion 24 is inserted in a corresponding first through hole 132 and is held by a corresponding first holding portion 132a. The first glue body 40 fixes the first optical fibers 20 in the first receiving grooves 118.

Each of the second optical fibers 30 includes a second main portion 32 which is substantially circular in section, and a coaxial second front portion 34. The second main portion 32 comprises a core portion, and a cladding portion surrounding the core portion. The second front portion 34 comprises the core portion exposed from the cladding portion, and the second front portion 34 has a certain critical length. Each second main portion 32 is received in a corresponding second receiving groove 128, and each second front portion 34 is inserted in a corresponding second through hole 134 and is held by a corresponding second holding portion 134a. The second glue body 50 fixes the second optical fibers 30 in the second receiving grooves 128.

When the optical fiber coupling connector 100 is assembled, first, the first main portions 22 are received in the first receiving grooves 118, and the first front portions 24 are inserted in the first through holes 132 and are held by the first holding portions 132a. Second, liquid glue is dispensed in the upper recess 110, to create the first glue body 40 in liquid form surrounding the first main portions 22. Third, the first glue body 40 is solidified. Fourth, the second main portions 32 are received in the second receiving grooves 128, and the second front portions 34 are inserted in the second through holes 134 and are held by the second holding portions 134a. Fifth, liquid glue is dispensed in the lower recess 120, to create the second glue body 50 in liquid form surrounding the second main portions 32. Sixth, the second glue body 50 is solidified. During the assembly process, the first receiving portions 132b allow easy insertion of the first front portions 24 into the first through holes 132, and the second receiving portions 134b allow easy insertion of the second front portions 34 into the second through holes 134. In addition, even if the liquid glue corresponding to the first glue body 40 and the liquid glue corresponding to the second glue body 50 is used excessively, the excess of liquid glue corresponding to the first glue body 40 flows harmlessly into the first receiving recesses 112, and the excess of liquid glue corresponding to the second glue body 50 flows harmlessly into the second receiving recesses 122. In this embodiment, the liquid glue corresponding to each of the first glue body 40 and the second glue body 50 is ultraviolet (UV) curable adhesive.

In the optical fiber coupling connector 100 of a given size, the group of second optical fibers 30 below and parallel to the group of first optical fibers 20 provides a large total number of light paths of the optical fiber coupling connector 100 without unduly increasing the overall width of the optical fiber coupling connector 100. Therefore, the optical fiber coupling connector 100 can provide high transmission capacity and still be compact.

Even though numerous characteristics and advantages of the present embodiments have been set forth in the foregoing description, together with details of the structures and functions of the embodiments, the disclosure is illustrative only, and changes may be made in detail, especially in the matters of shape, size, and the arrangement of parts within the principles of the disclosure to the full extent indicated by the broad general meaning of the terms in which the appended claims are expressed.

What is claimed is:
1. An optical fiber coupling connector comprising:
a main body comprising an upper surface, a lower surface opposite to the upper surface, a front surface, and a back surface opposite to the front surface, the front surface and the back surface interconnected between the upper surface and the lower surface;
the upper surface defining an upper recess passing through the back surface, the lower surface defining a lower recess passing through the back surface;
the front surface defining a plurality of first through holes communicating with the upper recess and a plurality of second through holes communicating with the lower recess, the first through holes arranged side by side at equal intervals along a same imaginary first plane, with centers of the first through holes coinciding with the first plane, and the second through holes arranged side by side at equal intervals along a same imaginary second plane, with centers of the second through holes coinciding with the second plane;
the first plane being below and substantially parallel to the second plane, and the second plane partially or entirely overlapping the first plane;
a plurality of first optical fibers received in the upper recess and extending in the respective first through holes;

a plurality of second optical fibers received in the lower recess and extending in the respective second through holes;
a first glue body filled in the upper recess thereby securing the first optical fibers in the main body; and
a second glue body filled in the lower recess thereby securing the second optical fibers in the main body.

2. The optical fiber coupling connector of claim 1, wherein the upper surface further defines a first receiving recess, the first receiving recess communicates with the upper recess, and the first receiving recess is configured for receiving excess liquid glue corresponding to the first glue body during manufacturing of the optical fiber coupling connector.

3. The optical fiber coupling connector of claim 2, wherein the lower surface further defines a second receiving recess, the second receiving recess communicates with the lower recess, and the second receiving recess is configured for receiving excess liquid glue corresponding to the second glue body during manufacturing of the optical fiber coupling connector.

4. The optical fiber coupling connector of claim 1, wherein each of the first optical fibers comprises a first main portion and a coaxial first front portion, the first main portion comprises a core portion, and a cladding portion surrounding the core portion, the first front portion comprises the core portion exposed from the cladding portion, the main body further comprises a first recessed surface and a first side surface both bordering the upper recess, the first recessed surface defines a plurality of first receiving grooves, the first through holes pass through the first side surface and the front surface, the first main portions are received in the respective first receiving grooves, and the first front portions are inserted in the respective first through holes.

5. The optical fiber coupling connector of claim 4, wherein each of the second optical fibers comprises a second main portion and a coaxial second front portion, the second main portion comprises a core portion, and a cladding portion surrounding the core portion, the second front portion comprises the core portion exposed from the cladding portion, the main body further comprises a second recessed surface and a second side surface both bordering the lower recess, the second recessed surface defines a plurality of second receiving grooves, the second through holes pass through the second side surface and the front surface, the second main portions are received in the respective second receiving grooves, and the second front portions are inserted in the respective second through holes.

6. The optical fiber coupling connector of claim 5, wherein each of the first through holes comprises a first receiving portion and a first holding portion communicating with the first receiving portion, and the first holding portion and the first receiving portion are arranged in that order from the front surface to the first side surface.

7. The optical fiber coupling connector of claim 6, wherein the first holding portion is substantially cylindrical, the first receiving portion is substantially in the shape of a truncated cone, and the diameter of the first receiving portion gradually decreases along a direction from the first side surface to the front surface.

8. The optical fiber coupling connector of claim 6, wherein each of the second through holes comprises a second receiving portion and a second holding portion communicating with the second receiving portion, and the second holding portion and the second receiving portion are arranged in that order from the front surface to the second side surface.

9. The optical fiber coupling connector of claim 8, wherein the second holding portion is substantially cylindrical, the second receiving portion is substantially in the shape of a truncated cone, and the diameter of the second receiving portion gradually decreases along a direction from the second side surface to the front surface.

10. The optical fiber coupling connector of claim 1, wherein the front surface defines two locating holes, and each of the upper recess and the lower recess is located between two alignments defined by the lengths of the two locating holes.

\* \* \* \* \*